Dec. 2, 1924.                                       1,518,035
J. W. WILHELM
BABY CARRIER
Filed March 17, 1924
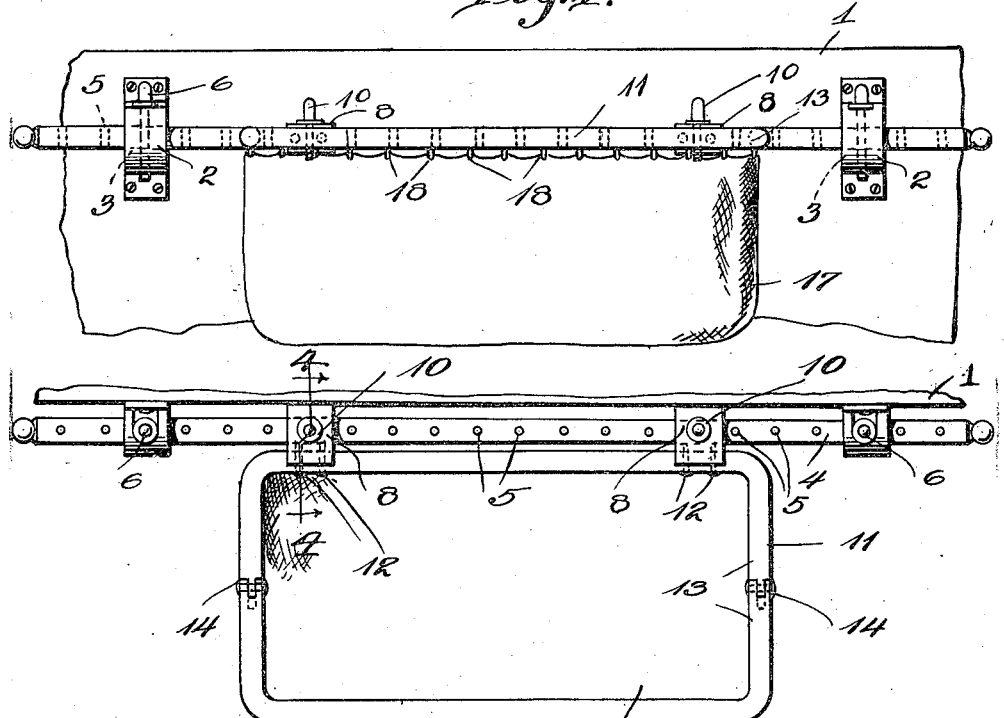
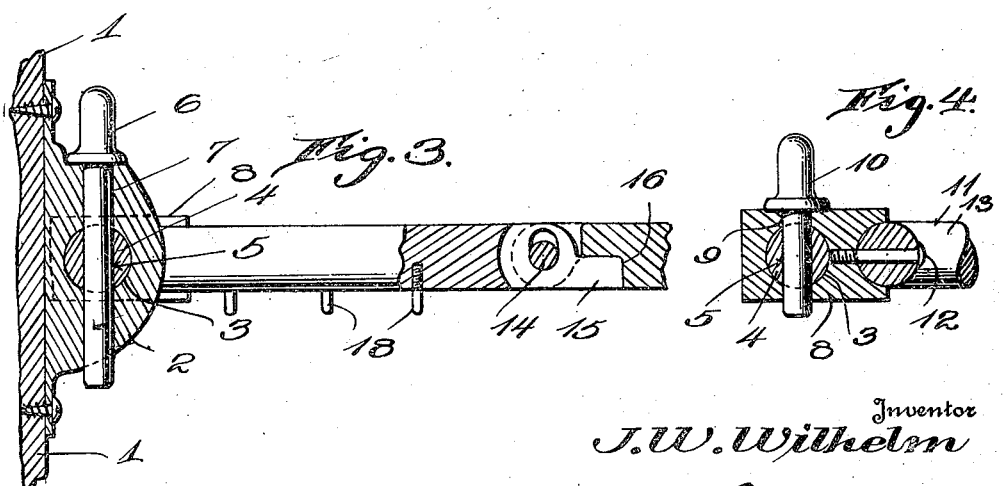
Inventor
J. W. Wilhelm
By D. Swift
Attorney Patented Dec. 2, 1924.

1,518,035

UNITED STATES PATENT OFFICE.

JOHN WALTER WILHELM, OF ST. PETERSBURG, FLORIDA.

BABY CARRIER.

Application filed March 17, 1924. Serial No. 699,784.

*To all whom it may concern:*

Be it known that I, JOHN W. WILHELM, a citizen of the United States, residing at St. Petersburg, in the county of Pinellas, State of Florida, have invented a new and useful Baby Carrier; and I do hereby declare the following to be a full, clear, and exact description of the invention, such as will enable others skilled in the art to which it appertains to make and use the same.

The invention relates to baby carriers, and has for its object to provide a device of this character which is foldable into a compact package, and which may be easily applied or attached to a support, for instance an automobile body, or in connection with any other vehicle, for instance an ambulance, train, steam boat or the like.

A further object is to provide a baby carrier comprising a rectangular shaped frame having a fabric container carried thereby, and which frame is foldable onto itself. Also to provide the rectangular shaped frame with blocks slidably and adjustably mounted on a bar whereby said frame may be positioned in various positions in a horizontal plane. Also to adjustably mount the bar in supporting brackets.

A further object is to provide pin and aperture means for holding the bar against rotation in the brackets and the blocks carried by the foldable frame against rotation on the bar.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a view in elevation of the device, showing the same applied to a portion of an automobile body.

Figure 2 is a top plan view of the baby carrier.

Figure 3 is a detail sectional view through one of the supporting brackets, and showing a portion of the foldable frame broken away to better show the structure.

Figure 4 is a detail sectional view taken on line 4—4 of Figure 2.

Referring to the drawing, the numeral 1 designates a portion of an automobile body, and 2 brackets secured to the inner sides thereof. Extending through apertures 3 in the brackets 2 is a horizontally disposed supporting bar 4, which bar is provided with a plurality of apertures 5 in any one of which the securing pins 6, which extend through apertures 7 in the brackets 2, may be received for holding the supporting bar 4 against rotation. Slidably mounted on the supporting bar 4 are spaced blocks 8, which blocks are provided with apertures 9 adapted to be placed in registration with any of the apertures 5, and to receive removable pins 10 for holding said blocks 8 in any position to which they may be moved. It will be seen that when the pins 10 are removed, the rectangular shaped frame 11 secured thereto by means of screws 12 may move downwardly to a position in parallel relation to the portion 1 of the body of the automobile, where it will be out of the way of occupants of the automobile, and will not take up a material amount of room in the automobile.

The rectangular shaped frame 11 is formed from hingedly connected U-shaped members 13, which members are hingedly connected together at 14, and consequently may be folded onto each other for reducing the size of the frame when in collapsed or folded position, and when the frame is in horizontal position the frame sections 13 are held in the same horizontal plane by the lugs 15 which engage the walls 16 of the arms of the outer U-shaped frame 13, therefore it will be seen that the fabric container 17, which is supported from the hooks 18 carried by the under sides of the U-shaped members 13 may receive a baby and bedding for the baby. The fabric container 17 may be formed from a closely woven fabric or from a net work if desired.

From the above it will be seen that a baby carrier is provided, which may be easily and quickly applied to an automobile body, an ambulance, or to any other support, and that the carrier may be collapsed and folded into a compact package when not in use. It will also be seen that the rectangular shaped frame is formed from hingedly connected sections which may be folded onto each other, thereby limiting the position of the frame when in lowered position in relation to the floor of an automobile, consequently allowing the use of a relatively large frame if desired.

The invention having been set forth what is claimed as new and useful is:—

1. A baby carrier comprising a horizontally disposed bar, said bar being supported by spaced brackets and rotatably mounted in apertures therein, pins carried by said brackets and extending through registering apertures in the brackets and the bar, blocks adjustably mounted on the bar, pins extending through registering apertures in the blocks and the bar, a horizontally disposed frame carried by the blocks and a collapsible receptacle carried by said frame.

2. A baby carrier comprising a horizontally disposed bar having a plurality of apertures therein, brackets through which said bar extends, said brackets being provided with pins extending therethrough and through registering apertures in the bar, blocks slidably mounted on the bar and having apertures adapted to register with the apertures of the bar, securing pins extending through the apertures of the blocks and the bar, a rectangular shaped frame carried by said blocks, said frame being formed from U-shaped members hingedly connected and foldable onto each other, said pins carried by the blocks forming means for holding the frame in a horizontal position and for allowing the frame to assume a position in a vertical plane and a fabric container carried by the rectangular shaped frame.

3. A baby carrier comprising a horizontally disposed bar, brackets for supporting said bar, means carried by the brackets and cooperating with the bar for preventing rotation thereof, a rectangular shaped frame, said frame being provided with blocks through which the bar extends, means carried by said blocks for preventing rotation thereof on the bar, said rectangular shaped frame being formed from hingedly connected sections, and means carried by the under sides of the hingedly connected sections for detachably holding a fabric container.

In testimony whereof I have signed my name to this specification in the presence of two subscribing witnesses.

JOHN WALTER WILHELM.

Witnesses:
 CLARENCE E. HAFF,
 Mrs. LILLIAN E. BRUCE.